Patented Feb. 6, 1934

1,946,459

UNITED STATES PATENT OFFICE 1,946,459

METHOD FOR PRODUCING SYNTHETIC RESIN

Frederick S. Granger, Elizabeth, N. J., assignor to Combustion Utilities Corporation, New York, N. Y., a corporation of Maine No Drawing. Application April 30, 1930
Serial No. 448,802

14 Claims. (Cl. 260—4)

The present invention relates to the production of synthetic resins of the phenol formaldehyde type, and more particularly to potentially reactive resins of this type prepared from alkaline mixtures of phenolic bodies with formaldehyde or other substances containing at least one reactive methylene radical.

Among the processes in present day use for the production of the phenol formaldehyde type of resins are those in which phenol or other phenolic substance is dissolved, in an aqueous solution of an alkali such as caustic soda, and this alkaline solution of phenol is reacted with an aldehyde-containing substance such as formaldehyde at suitable temperatures, preferably near the boiling point of the mixture. The resins ultimately formed are in some instances bodied by a suitable heat treatment following the condensation reaction, especially where they are to be subsequently employed in liquid form. In other instances the reaction mixture is diluted with water and neutralized, upon which the resinous product is precipitated and removed from the reaction mixture as a more or less granular solid.

These alkaline processes for synthetic resin production are open to the objection that, unless very carefully controlled, considerable loss of formaldehyde results due to the reaction of formaldehyde with the caustic soda or other alkali employed,—thereby producing methanol, and sodium formate in accordance with the well-known Cannizzaro's reaction. Not only is the valuable formaldehyde destroyed in this manner, but because of the resultant deficiency of formaldehyde, the time required for the heat treatment of the reaction mixture in order to obtain a resin of the proper physical form is unnecessarily lengthened.

Among the more important objects of the present invention, therefore, are to provide for producing valuable synthetic resins of the phenol formaldehyde type from alkaline mixtures of phenolic bodies and formaldehyde or mixtures containing formaldehyde under conditions adapted to materially diminish the loss of formaldehyde due to side reactions thereof with alkali; and to provide for the production of such resins under conditions whereby the heating period normally required for the resin production is materially reduced.

It is already known that phenols in alkaline solution combine with formaldehyde to form phenol alcohols, in which reaction one molecule may combine with more than one molecule of formaldehyde. These phenol alcohols are not resins but are changed to resins by heating.

The present invention is based upon the discovery that when an alkaline solution of a phenolic substance such as phenol or higher tar acids is reacted with formaldehyde or equivalent aldehyde-containing substance, the ratio of formaldehyde consumed by Cannizzaro's reaction to the formaldehyde reacting with the phenolic substance to form valuable intermediate condensation products decreases substantially as the temperature of the treatment is lowered and that this ratio is very substantially less at room temperature than at or near the boiling point of the reacting mixture. It has thus been found possible to utilize the bulk of the formaldehyde in forming more or less water-soluble and crystallizable phenol alcohols by reaction with the alkaline phenolates at or near room temperature. Resinification of the resultant reaction mixture containing the "fixed" formaldehyde or other aldehyde largely in the form of phenol alcohols is then effected by heating the said mixture to the desired temperature, preferably around its boiling point.

It is not essential that room temperature be employed for the initial reaction whereby phenol alcohols are produced. On the contrary, it is possible to use lower temperatures or to use others as high as 60° C., for initiating the reaction leading to the production of phenol alcohols in accordance with the present invention,—the essential feature being that a sufficiently low temperature is employed to insure that Cannizzaro's reaction will occur to a substantially lesser degree,—in comparison with the reaction occurring between phenol and formaldehyde,—than is the case at the higher temperatures normally employed for producing the resin so that the formaldehyde reacts or combines with the phenol before the mixture is heated. The quantity of aldehyde which may be fixed is not limited to the equal molecular equivalent of the phenolic body used, since a phenol molecule may combined with more than one molecule of formaldehyde. The phenol alcohols are convertible into potentially-reactive resins by a subsequent treatment as by heating or boiling the reaction mixture for a suitable length of time, especially in the presence of a condensing agent such as caustic alkali.

There is substantial variation between the various phenolic bodies with respect to the degree of their reactivity with formaldehyde under the alkaline conditions named. For example, in the case of phenol and some of its homologues, the reaction mixture may stand at room temperature for many days without the formation by resinification of an appreciable quantity of resin,— whereas the formation of the crystallizable phenol alcohol by which the formaldehyde is fixed and removed from the solution as such is complete in from one to several days, depending upon whether one or more molecules of formaldehyde are to be fixed per molecule of phenol. On the other hand, with certain of the higher molecular weight phenols, especially those containing two side chains, one ortho and the other meta to hydroxyl, and para to each other,—such for example as thymol and the corresponding xylenol,— the phenol aclohol reaction is very much more rapid than with phenol, so that the fixation of one molecule of formaldehyde for each molecule of the said phenolic body is complete at room temperature within a few hours,—and if this reaction mixture is permitted to stand for several days at room temperature, considerable quantities of the final resin are formed.

After the reaction between the alkaline phenolate and formaldehyde in the cold at atmospheric temperature has progressed for the desired length of time, the reaction mixture is preferably heated for from one to several hours to facilitate the resinification reaction, following which the strongly alkaline reaction mixture may be diluted with water and is neutralized or acidified with an acid such as dilute sulphuric acid, in well-known manner as more particularly set out in the co-pending application of M. R. Bhagwat Serial #353,675 filed April 8th, 1929. The reaction mixture may, if desired, be cooled to or near room temperature before adding the acid. The resin is precipitated by this step in a physical form which will vary from a liquid to a massive or granular or gelatinous solid, according to the length of time employed for the heat treatment. Furthermore the resin may be precipitated in liquid state from the hot reaction mixture after the acid treatment, and the resinified product concentrated or thickened by a heat treatment at temperatures of 200° C. or below, by which the water and volatile impurities are removed by vaporization.

The following examples serve to illustrate certain forms of the present invention, although it is not applicant's intention to limit the scope of the invention excepting as it is defined in the accompanying claims.

Example 1

94 grams of phenol, 40 grams of caustic soda, and 75 cc. of a 40% aqueous formaldehyde solution are dissolved in sufficient water to make 250 cc. of solution, and this mixture is then permitted to stand at room temperature for 24 hours. If desired, this period allowed for reaction at room temperature and the production of phenol alcohol may be considerably further prolonged without substantial resinification occurring. The formaldehyde reacts with the phenol to form phenol alcohol, the completion of the reaction being manifested by the disappearance of the formaldehyde odor. After the reaction in the cold has progressed to the desired degree, the solution is diluted with an equal volume of water, and the resultant mixture is boiled for five hours under a reflux condenser, following which it is cooled and neutralized with a dilute solution of hydrochloric acid. Upon neutralization the phenol formaldehyde resins of the potential reactive type are precipitated in granular form, particularly where the solution containing them is held at temperatures around 45° C. during this treatment. These resins are then filtered off, washed with water and dried by any well-known method. In the above run there was no appreciable loss of alkalinity due to the reaction with formaldehyde, so that substantially all of the latter entered into the condensation reaction with the phenol.

In contradistinction to these results, the treatment of a similar reaction mixture, which was not permitted to react at room temperatures for a substantial length of time prior to a heat treatment of the mixture at the boiling temperature for only five minutes, resulted in a loss by side reactions of 6.4% of the original formaldehyde employed. Other similar runs indicate that if sufficient time is not allowed for the formation of phenol alcohols by reaction of the formaldehyde and phenolic substance prior to the heat treatment, formaldehyde losses of as high as 12% in the case of phenol,—and formaldehyde losses of 35% and higher in the case of the higher boiling phenolic substances may result.

Furthermore the time of heating required for the resinification of a mixture of an alkaline phenolate and formaldehyde such as that set out in Example 1 to the point necessary for obtaining the resin in satisfactory granular form were reduced from 8 hours to 5 hours by permitting the reaction mixture to stand at room temperature for a number of days prior to the heat treatment thereof at or near the boiling point of the mixture. Similar results may be obtained by such treatment in the cold even for a day.

The present invention is also applicable to the treatment of other solutions of phenolic bodies in addition to phenol and its lower homologues. For example, the invention may be effectively applied to the treatment of the various tar acids and mixtures thereof obtained from either high or tow temperature tars or mixtures of such tars either in the form in which they are recovered from such tars or tar oils of after a preliminary purification treatment.

Example 2

11 cc. of an aqueous solution containing 3.44 grams of the total tar acids from a low temperature tar distillate having a boiling range up to 300° C., to which had been added one gram (one molar equivalent) of caustic soda in aqueous solution, had mixed therewith 1.9 cc. (an equimolar quantity) of a 40% aqueous formalin solution. This homogeneous mixture was allowed to stand at room temperature of about 25° C. for about 16 hours during which time phenol alcohols were formed and the formaldehyde odor disappeared from the mixture. Standing in the cold for as much as three hours gives good results. The latter was thereafter boiled for one hour, following which it was cooled and then neutralized with a dilute solution of hydrochloric acid, whereupon a very satisfactory yield of a potentially-reactive resin of the phenol formaldehyde type was obtained, the same being precipitated in fine, granular form. An examination indicated a loss by side reactions of less than one half of the formaldehyde so lost from a similar reaction mixture which was subjected to a five minute heat treatment at the boiling temperature of the mixture without first previously permitting time for substantial reaction to take place in the cold. The resins produced have fairly high melting points so that they may be subjected to a relatively high temperature during the subsequent heat treatment for drying them without substantial injury to the resin or their conversion into the insoluble, or the insoluble infusible state.

Under some conditions it may be desirable, after the reaction in the cold between the alkaline phenolate solution and formaldehyde to form phenol alcohols, to add additional amounts of formaldehyde to the reaction mixture before proceeding with the heat treatment for the production of the resins. It is already well-known that the yield of precipitated resin obtained by treatment of a phenolate solution with formaldehyde increases as the time of boiling the reaction mixture increases, up to a certain limit, which in the case of phenol is about eight hours for equi-molar mixtures of phenol, caustic soda, and formaldehyde, which have not been allowed to stand at room temperature prior to the said heat treatment. If the primary condensation is first allowed to complete itself at room temperature, the boiling time required to reach the final stage of maximum yield of perfectly solid, finely divided, precipitated resins is reduced. This heating time is still further reduced by increasing the proportion of formaldehyde in the mixture. For example a mixture of phenol, caustic soda and formaldehyde in equi-molar proportions were permitted to stand at room temperature for twelve days. An additional 20% of formaldehyde was then added to the reaction mixture and the latter was permitted to stand over night at room temperature. There was no resultant diminution in the alkalinity of the reaction mixture, such as would necessarily occur if any formaldehyde reacted therewith according to Cannizzaro's reaction, nor was there any precipitation observable upon neutralization, and the odor of formaldehyde had naturally disappeared. This reaction mixture was then heated to boiling for four hours and was then cooled and neutralized with dilute hydrochloric acid upon which the resin precipitated in the form of a finely-divided, light, bulky precipitate which settled slowly and was chalky white in appearance. In a similar run in which no added formaldehyde was employed after the first reaction had occurred between the ingredients of the mixture at room temperature, the resin was thrown down upon neutralization with acid in a less advanced, plastic coherent form resembling chewing gum.

The present invention is not limited to processes involving a treatment in the cold of reaction mixtures containing phenolic substances and formaldehyde by which the loss of the latter due to Cannizzaro's reaction are reduced or eliminated. In similar manner economies are effected in methods for the production of synthetic resins of the phenol-formaldehyde type in which other aldehydes and mixtures thereof are employed as for example acetaldehyde, or furfural, or mixtures of aldehydes with or without formaldehyde whereby these materials are caused to selectively react with the phenolic substances to produce more or less water-soluble intermediate products which are adapted to be subsequently resinified by heat treatment and whereby side reactions between the aldehydes and substances which do not tend to form resins by reaction therewith are substantially inhibited in whole or in part. It is within the scope of the present invention to add other resins and resin-modifying agents to the reaction mixture produced by the reaction in the cold between alkaline solutions of a phenolic substance and one or more aldehydes, before applying the high temperature employed for producing resinification. Among such materials are the natural resins, fusible synthetic resins of the phenol aldehyde type, inorganic and organic fillers, dyes, plasticizers, solvents such as alcohol, benzol and the like.

By the expression "phenolic substance" and similar terms employed in the specification and claims, it is intended to designate, in addition to phenols, their homologues and derivatives, including those cyclic unsaturated hydroxy compounds, (and particularly the hydroxyl derivatives of the hydro-aromatic or cyclic unsaturated hydrocarbons); which possess the property of reacting under suitable conditions with aldehydes to form valuable synthetic resins, whether or not potentially reactive.

The invention is not limited to the aldehyde treatment of alkaline solutions of phenolic substances prepared by a treatment of the latter with caustic alkalies. It is within the scope of the invention, on the other hand to substitute for such caustic alkalies other substances such as hydroxides of the alkaline earth metals and other water-soluble alkaline compounds capable of forming with such phenolic substances and mixtures containing the same so-called aqueous solutions or emulsions in which the active ingredients are in a form readily adapted for processing with aldehydes and other substances containing one or more reactive methylene groups to produce valuable synthetic resins. By controlling the composition of the reacting materials and the conditions of the resinification reaction, it is possible in accordance with the practice of the present invention to make synthetic resins having a wide variety of physical properties. The invention is susceptible of modification within the scope of the appended claims.

I claim:

1. The process for the production of potentially-reactive synthetic resins of the phenol formaldehyde type which comprises the steps of reacting together in the cold for a period of at least three hours, a mixture comprising an alkaline phenolate solution and an aldehyde, thereafter heating the reaction mixture at a temperature substantially above 60° C. to facilitate a resinification reaction and the production of the said resins, neutralizing the resultant reaction mixture with a dilute acid, thereby precipitating the said synthetic resins, and recovering the latter.

2. The process of producing potentially-reactive synthetic resins of the phenol formaldehyde type, which comprises reacting a mixture containing an aldehyde and a caustic alkali solution of a cyclic benzenoid unsaturated compound containing at least one hydroxyl group directly attached to the nucleus, at a temperature below 60° C., for a period of time adapted to facilitate reaction of the phenolic substances with the aldehyde and the production of more or less water-soluble crystallizable phenol alcohols, subsequently heating and reacting the reaction mixture in the presence of the said caustic alkali thereby forming potentially-reactive synthetic resins, and neutralizing the resultant reaction mixture thereby precipitating the said resins.

3. The process of producing potentially-reactive synthetic resins of the phenol formaldehyde type, which comprises reacting at a temperature below 60° C., a mixture containing formaldehyde and a caustic alkali solution of a cyclic unsaturated compound containing at least one hydroxyl group, directly attached to the nucleus, for a period of time sufficient to produce phenol alcohols by interaction between the formaldehyde and the phenolic substance while substantially retarding side reaction between the formaldehyde and the caustic alkali, subsequently heating the resultant strongly alkaline reaction mixture thereby producing potentially-reactive synthetic resins, and neutralizing the reaction mixture thereby precipitating the said resins.

4. The process of producing potentially-reactive synthetic resins of the phenol formaldehyde type, which comprises reacting at a temperature below 60° C., a mixture containing an alkaline alkali metal compound, a cyclic unsaturated compound containing at least one hydroxyl group, directly attached to the nucleus, and formaldehyde for a length of time sufficient to form substances of the general character of phenol alcohols by reaction between the said cyclic compound and the formaldehyde, but insufficient to effect substantial resinification, thereby substantially retarding side reaction between the formaldehyde and the alkaline alkali metal compound, the formaldehyde being present in at least equimolar proportions with respect to the cyclic compound, subsequently heating the resultant reaction mixture to a temperature substantially above 60° C. while the latter is strongly alkaline thereby causing the formation of potentially-reactive synthetic resins, neutralizing the said reaction mixture to precipitate the synthetic resin, and recovering the latter.

5. The process of producing potentially-reactive synthetic resins of the phenol formaldehyde type, which comprises reacting at a temperature below 60° C., a mixture containing a caustic alkali, the mixed tar acids of a low temperature tar distillate boiling below 300° C., and formaldehyde for a time sufficient to produce phenol alcohols by reaction between the tar acids and the formaldehyde, but insufficient to cause substantial resinification thereof and while substantially limiting or preventing side reaction between the formaldehyde and the caustic alkali, subsequently heating the resultant reaction mixture under strongly alkaline conditions, thereby causing formation of potentially-reactive resins, neutralizing the reaction mixture thereby precipitating the said resins, and recovering the latter.

6. The process for the production of potentially-reactive synthetic resins of the phenol formaldehyde type, which comprises reacting together in the cold for a period of at least three hours, a mixture comprising an alkali phenolate solution and formaldehyde, thereafter heating the reaction mixture while strongly alkaline in reaction thereby producing potentially-reactive resins, neutralizing the said reaction mixture to precipitate the resins therefrom, and recovering the latter.

7. The process for the production of potentially-reactive synthetic resins of the phenol formaldehyde type, which comprises reacting together in the cold for a period of at least three hours a mixture comprising a solution of the tar acids of coal tar in caustic alkali and formaldehyde thereby producing phenol alcohols of the tar acids, thereafter heating the resultant reaction mixture while the latter is strongly alkaline for the resinification of the phenol alcohols of the tar acids and the production of potentially-reactive resins, neutralizing the resultant reaction mixture thereby precipitating the said resins, and recovering the latter.

8. The process for the production of potentially reactive synthetic resins of the phenol formaldehyde type, which comprises reacting together in the cold for a period of at least three hours a mixture comprising equimolar amounts of a caustic alkali and the high boiling tar acids obtained from a low temperature tar distillate having a boiling range up to 300° C., and at least an equimolar amount of formaldehyde, thereafter heating the reaction mixture while strongly alkaline for facilitating a resinification reaction and the production of potentially-reactive resins, thereafter neutralizing the resultant reaction mixture thereby precipitating the said resins, and recovering the latter.

9. The process for the production of potentially-reactive synthetic resins of the phenol formaldehyde type, which comprises reacting together in the cold for a substantial period of time a mixture comprising a caustic alkali solution of tar acids and at least an equimolar portion of formaldehyde whereby the major portion of the formaldehyde is fixed by reaction with the tar acids without substantial resinification, and the loss of formaldehyde by side reaction with the alkali present is substantially reduced or prevented, thereafter heating the reaction mixture while strongly alkaline for the formation of potentially-reactive resins, subsequently neutralizing the reaction mixture thereby precipitating the said resins, and recovering and washing the latter.

10. The process of producing potentially-reactive synthetic resins, which comprises reacting together the ingredients of a liquid mixture comprising an aqueous solution of an alkali metal phenolate and an aldehyde at a temperature below 60° C., for a period of time sufficient to fix the aldehyde by reaction with the phenolic ingredient of the phenolate to produce phenol alcohols, but insufficient to effect substantial resinification of such phenol alcohols, thereby limiting or preventing substantial side reaction between the aldehyde and any free alkali present, subsequently adding additional aldehyde and reacting the same with the liquid mixture for a substantial period of time at a temperature below 60° C., and subsequently heating the mixture while strongly alkaline to cause condensation reaction and the formation of potentially-reactive resins, thereafter neutralizing the resultant reaction mixture for precipitating the said resin, and recovering the latter.

11. The process as defined in claim 10 in which the aldehyde employed is formaldehyde.

12. The process for the production of potentially-reactive synthetic resins, which comprises reacting together at a temperature not higher than 60° C., the ingredients of a liquid mixture comprising formaldehyde and an alkaline solution of an alkali metal salt of the tar acids derived from low temperature tar, the said solution containing approximately equimolar portions of a caustic alkali and of the said tar acids, and the formaldehyde being present in amount at least a molar equivalent of the tar acids, the said reaction being conducted for a period of time sufficient to fix the major portion at least of the formaldehyde by reaction with the tar acids to produce phenol alcohols, subsequently adding additional formaldehyde to the reaction mixture and heating the latter while strongly alkaline thereby producing potentially-reactive synthetic resins, neutralizing the said reaction mixture thereby precipitating these resins, and recovering the latter.

13. The process of producing potentially-reactive synthetic resins of the phenol formaldehyde type, which comprises reacting at a temperature below 60° C. a mixture containing formaldehyde and a caustic alkali solution of a phenolic substance, thus producing more or less water-soluble phenol alcohols, thereafter heating and reacting the mixture in the presence of the said caustic alkali thereby forming potentially reactive synthetic resins, cooling the reaction mixture and neutralizing the same, thereby precipitating the potentially-reactive resins.

14. The process of producing potentially-reactive synthetic resins of the phenol formaldehyde type, which comprises the steps of reacting a mixture containing an alkaline solution of tar acids and formaldehyde at a temperature below 60° C. for a period sufficient to produce phenol alcohols while substantially retarding reaction between the formaldehyde and the substance imparting alkalinity to the said alkaline solution, subsequently heating the strongly alkaline reaction mixture thereby producing the said synthetic resins, neutralizing the resultant reaction mixture thereby precipitating the synthetic resins, and separating the latter from the remaining reaction mixture.

FREDERICK S. GRANGER.